(12) United States Patent
Griffin et al.

(10) Patent No.: US 6,410,085 B1
(45) Date of Patent: Jun. 25, 2002

(54) METHOD OF MACHINING OF POLYCRYSTALLINE DIAMOND

(75) Inventors: Nigel Dennis Griffin, Nympsfield; Peter Raymond Hughes, Stroud, both of (GB)

(73) Assignee: Camco International (UK) Limited (GB)

( * ) Notice: Subject to any disclaimer, the term of this patent is extended or adjusted under 35 U.S.C. 154(b) by 0 days.

(21) Appl. No.: 09/682,425

(22) Filed: Aug. 31, 2001

Related U.S. Application Data

(60) Provisional application No. 60/234,075, filed on Sep. 20, 2000, and provisional application No. 60/281,054, filed on Apr. 2, 2001.

(51) Int. Cl.⁷ .............................................. C23C 16/26
(52) U.S. Cl. .................... 427/247.7; 427/250; 407/119; 205/181
(58) Field of Search ................................ 407/118, 119; 427/250, 249.7, 249.8; 205/181

(56) References Cited

U.S. PATENT DOCUMENTS

| | | | | |
|---|---|---|---|---|
| 3,745,623 A | * | 7/1973 | Wentor | ........................ 407/119 |
| 4,387,287 A | | 6/1983 | Marazzi | |
| 4,481,016 A | | 11/1984 | Campbell et al. | |
| 4,525,179 A | | 6/1985 | Gigi | |
| 4,629,373 A | * | 12/1986 | Hall | ........................... 428/408 |
| 4,664,705 A | | 5/1987 | Horton et al. | |
| 4,670,025 A | | 6/1987 | Pipkin | |
| 4,940,180 A | | 7/1990 | Martell | |
| 4,984,642 A | * | 1/1991 | Renard et al. | .............. 175/329 |
| 5,127,923 A | | 7/1992 | Bunting et al. | |
| 5,833,021 A | | 11/1998 | Mensa-Wilmot et al. | |
| 6,011,232 A | | 1/2000 | Matthias | |

FOREIGN PATENT DOCUMENTS

| | | |
|---|---|---|
| EP | 0 857 537 | 8/1998 |
| WO | WO 00/28106 | 5/2000 |

OTHER PUBLICATIONS

European Search Report, Application No. EP 01 30 7316, "Documents Considered To Be Relevant," Feb. 26, 2002.

* cited by examiner

Primary Examiner—Bret Chen
(74) Attorney, Agent, or Firm—Jeffery E. Daly

(57) ABSTRACT

A method of machining a polycrystalline diamond material including a matrix of interstices containing a catalyzing material and a volume close to a working surface thereof substantially free of catalyzing material which comprises the steps of treating the volume to render the polycrystalline diamond electrically conductive, and using an electron discharge machining technique to machine the polycrystalline diamond. In one embodiment, the treatment comprises applying a conductive material layer to a surface of the diamond.

9 Claims, 1 Drawing Sheet

METHOD OF MACHINING OF POLYCRYSTALLINE DIAMOND

CROSS REFERENCE TO RELATED APPLICATIONS

This application claims priority from U.S. Provisional Patent Application No. 60/234,075 filed Sep. 20, 2000, and from U.S. Provisional Patent Application No. 60/281,054 filed Apr. 2, 2001.

BACKGROUND OF INVENTION

1. Field of the Invention

This invention relates to machining techniques for use with polycrystalline diamond.

2. Description of the Related Art

It is known, for example in the manufacture of cutters for earth boring drill bits, to form a relatively large diameter polycrystalline diamond component bonded to a substrate, and then to machine the component to cut the component into a plurality of pieces. This technique for use in the manufacture of cutters is described in, for example, U.S. Pat. No. 6,011,232 and EP 0857537.

The machining technique used in the manufacture of such a cutter is most often an electron discharge machine (EDM) technique, and relies upon the component being machined being of electrically conductive form. Generally, polycrystalline diamond components comprise a plurality of diamond crystals defining therebetween a matrix of interstices. The interstices usually contain a catalyzing material, typically cobalt, used in the formation of the polycrystalline diamond and in bonding the diamond to the substrate. The presence of cobalt in the interstices renders the component electrically conductive and hence suitable for use with electron discharge machining techniques.

It has been found that the abrasion resistance of a polycrystalline diamond cutter can be increased by removing the catalyzing material from a volume of the polycrystalline diamond close to a working surface thereof. Although treatment of the polycrystalline diamond to render the interstices close to the working surface substantially free of catalyzing material improves the wear resistance, it also results in the part of the polycrystalline diamond close to the working surface being of poor electrical conductivity and hence electron discharge machining techniques cannot be used effectively in machining polycrystalline diamonds so treated.

It is an object of the invention to provide a technique whereby machining of such polycrystalline diamonds can be achieved in a simple and convenient manner.

SUMMARY OF INVENTION

According to the present invention there is provided a machining method comprising treating a polycrystalline diamond component of the type including a volume close to a working surface that is substantially free of catalyzing material to render the polycrystalline diamond electrically conductive, and using an electron discharge machining technique to machine the polycrystalline diamond material.

The polycrystalline diamond may be plated with an electrically conductive material to render it conductive. Alternatively, an infiltration technique may be used to infiltrate a conductive material into the interstices from which catalyzing material has been removed to render the polycrystalline diamond electrically conductive.

Where a plating technique is used, the polycrystalline diamond may be plated with a layer of nickel or another metallic material.

Where an infiltration technique is used, the technique may involve vacuum impregnation of a conductive paint, a graphite suspension or another electrically conductive material into the interstices. Alternatively a pressure impregnation technique may be used with, for example, graphite or other electrically conductive media such as a mounting compound.

BRIEF DESCRIPTION OF DRAWINGS

The invention will further be described, by way of example, with reference to the accompanying drawings.

DETAILED DESCRIPTION

Figure 1:
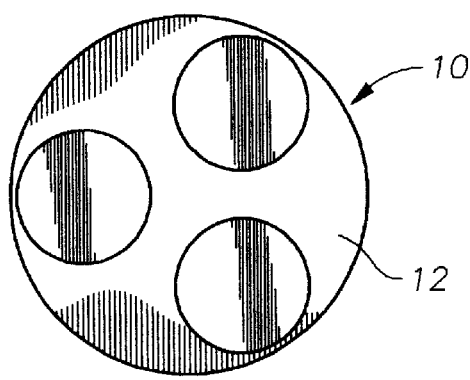
FIG. 1 is a plan view of a polycrystalline diamond component.
Figure 2:
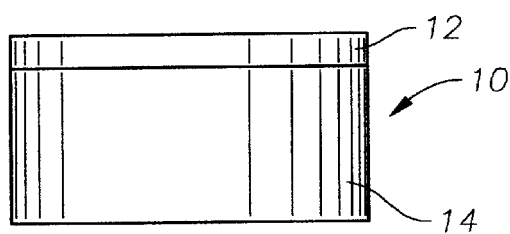
FIG. 2 is a side view of the component of FIG. 1.

FIGS. 1 and 2 illustrate a component 10 intended for use in the formation of three cutters for use in earth boring drill bits. Although the invention will be described in relation to the formation of cutters for earth boring drill bits, the invention can be used in connection with other components, for example wire-drawing dies, bearing components or other components subject to wear, in use. The component 10 comprises a polycrystalline diamond table 12 bonded to a substrate 14 of tungsten carbide. The component is manufactured using a well known technique involving exposing a substrate, diamond powder and a catalyst to high temperature, high pressure conditions.

Figure 3:
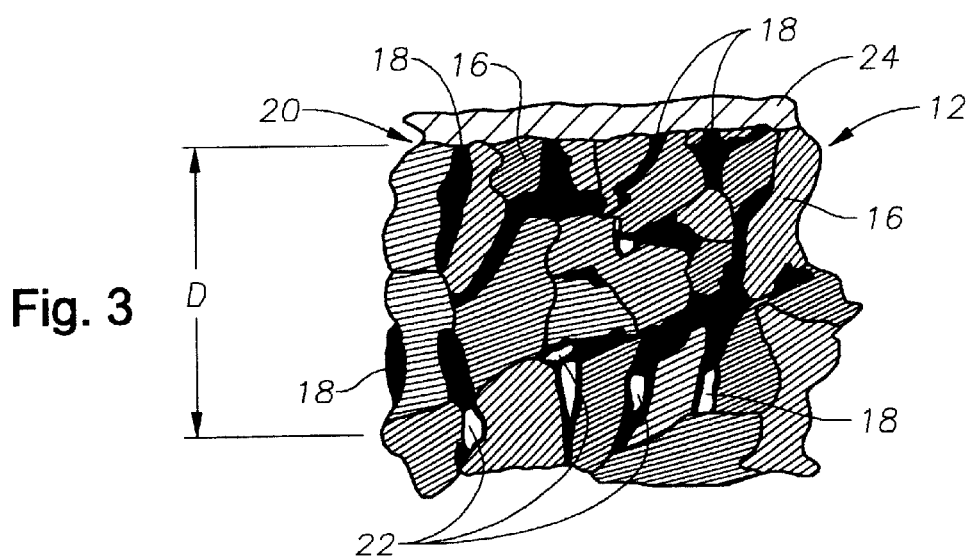
FIG. 3 is a diagrammatic view illustrating the structure of part of the component of FIG. 1.

The polycrystalline diamond table 12 of a component 10 manufactured in this manner takes the form of diamond crystals that define therebetween a matrix of interstices containing the catalyzing material. It has been found that, by appropriate treatment of the component 10 to remove the catalyzing material from the interstices located within a volume close to a surface which, in the final product, will be a working surface thereof, the abrasion resistance can be improved. The removal of the catalyzing material can be achieved in a number of ways. For example, the catalyzing material can be leached from the component. Such leaching of the catalyzing material leaves the component 10 with a layer or volume of porous form, as shown in FIG. 3. The leaching of the catalyzing material further results in the component 10 including a layer or volume of poor electrical conductivity with the result that electron discharge machining techniques cannot be used in machining the component.

In order to allow an electrical discharge machining technique to be used, in accordance with the invention the component is treated to render it electrically conductive.

FIG. 3 illustrates part of the polycrystalline diamond table 12, showing that the table 12 is made up of diamond crystals 16 defining therebetween a matrix of interstices 18. Remote from a working surface 20, the interstices contain catalyzing material in the form of cobalt 22, the interstices 18 closer to the working surface 20 being substantially free of cobalt as it has been leached from the diamond to a depth D.

In order to render the component electrically conductive, an electrically conductive material plating is applied to the component. In the arrangement illustrated the plating comprises a layer 24 of nickel applied using a conventional plating/deposition technique.

The provision of the layer 24 allows an electron discharge machining technique, for example, a wire erosion EDM technique, to be used to cut from the component 10 three circular cutters.

Figure 4:
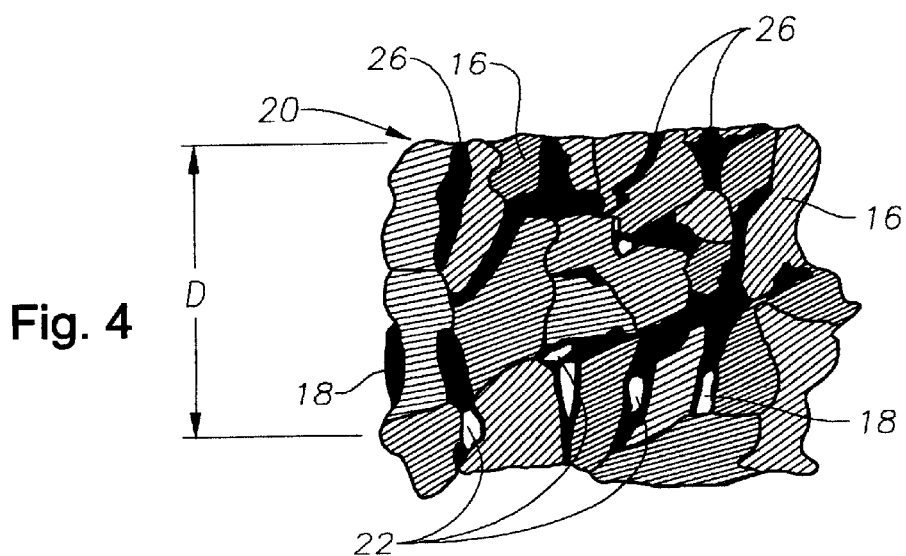
FIG. 4 is a view similar to FIG. 3 of an alternative arrangement.

FIG. 4 illustrates part of a component 10 treated in another way to render it electrically conductive. In the arrangement of FIG. 4, rather than apply a plating layer to the component, an infiltration technique is used to incorporate an electrically conductive material into the component 10. In FIG. 4, the electrically conductive material is a graphite suspension 26 that has been infiltrated into the interstices using a vacuum impregnation technique. Alternatively, a conductive paint material could be used. As further alternatives, a pressure impregnation technique may be used with a conductive media such as a mounting compound or with graphite.

Although specific embodiments of the invention have been described hereinbefore, it will be appreciated that modifications or alterations may be made to the embodiments without departing from the scope of the invention as defined by the appended claims.

Whereas the present invention has been described in particular relation to the drawings attached hereto, it should be understood that other and further modifications apart from those shown or suggested herein, may be made within the scope and spirit of the present invention.

What is claimed is:

1. A method for machining a polycrystalline diamond component, the polycrystalline diamond component including a matrix of interstices and wherein a first volume of the component adjacent to a working surface thereof is substantially free of catalyzing material, and a second volume of the component remote from the working surface contains the catalyzing material, comprising the steps of rendering the volume which is substantially free of catalyzing material electrically conductive, and using an electron discharge machining technique to machine the polycrystalline diamond.

2. A method according to claim 1, wherein the polycrystalline diamond component is treated by applying a layer of a conductive material to the working surface.

3. A method according to claim 2, wherein the layer of a conductive material comprises a layer of nickel.

4. A method according to claim 1, wherein the polycrystalline diamond component is treated to infiltrate a conductive material into the interstices of the volume close to the working surface.

5. A method according to claim 4, wherein the polycrystalline diamond component is infiltrated using a pressure impregnation technique.

6. A method according to claim 5, wherein the conductive material comprises one of an electrically conductive media and graphite.

7. A method according to claim 4, wherein the polycrystalline diamond component is infiltrated using a vacuum impregnation technique.

8. A method according to claim 7, wherein the conductive material comprises one of a graphite suspension and an electrically conductive paint.

9. A method according to claim 1, wherein the polycrystalline diamond component is bonded to a substrate, and the electron discharge machining technique is used to machine polycrystalline diamond cutters from the polycrystalline diamond.

* * * * *